(12) United States Patent
Lee et al.

(10) Patent No.: US 12,495,470 B2
(45) Date of Patent: Dec. 9, 2025

(54) UNDER-INDUCTION RANGE SYSTEM

(71) Applicant: PEACEWORLD CO., LTD, Hanam-si (KR)

(72) Inventors: Myung Ock Lee, Seongnam-si (KR); Sang Woo Kim, Seongnam-si (KR)

(73) Assignee: PEACEWORLD CO., LTD, Hanam-si (KR)

( * ) Notice: Subject to any disclaimer, the term of this patent is extended or adjusted under 35 U.S.C. 154(b) by 877 days.

(21) Appl. No.: 17/746,884

(22) Filed: May 17, 2022

(65) Prior Publication Data

US 2022/0279630 A1 Sep. 1, 2022

Related U.S. Application Data

(63) Continuation of application No. PCT/KR2020/004910, filed on Apr. 10, 2020.

(30) Foreign Application Priority Data

Mar. 13, 2020 (KR) ........................ 10-2020-0031239

(51) Int. Cl.
*H05B 6/12* (2006.01)
*H05B 6/06* (2006.01)

(52) U.S. Cl.
CPC ........... *H05B 6/1209* (2013.01); *H05B 6/062* (2013.01)

(58) Field of Classification Search
CPC ............ H05B 2213/05; H05B 2213/06; H05B 2213/07; H05B 6/06; H05B 6/062;
(Continued)

(56) References Cited

U.S. PATENT DOCUMENTS

2012/0118874 A1* 5/2012 Williams ............. H05B 6/1209
219/635
2018/0343024 A1* 11/2018 Sahebjavaher ..... H04M 1/0202
(Continued)

FOREIGN PATENT DOCUMENTS

JP 201100054476 A 3/2011
KR 101597173 B1 2/2016
(Continued)

OTHER PUBLICATIONS

WIPO, International Search Report ISA 210 for International Application No. PCT/KR2020/004910, Oct. 30, 2020, 3 pages.
(Continued)

*Primary Examiner* — Sang Y Paik
*Assistant Examiner* — Bonita Khlok
(74) *Attorney, Agent, or Firm* — Nicholas Park

(57) ABSTRACT

Provided is an under-induction range system including a top plate unit, an induction unit fixedly disposed at a lower side of the top plate unit and configured to heat a heating target container positioned in a space above the top plate unit using a magnetic field generated by a circular coil, a Hall sensor unit disposed in a central portion of the circular coil disposed in an inner space of the induction unit, a control unit electrically connected to the Hall sensor unit, and a multi-support unit which controls operation of the induction unit according to a measurement value detected by the Hall sensor unit when a magnetic member buried therein is positioned at a matching area of a top surface of the top plate unit and on which the heating target container is seated.

13 Claims, 5 Drawing Sheets

(58) Field of Classification Search
CPC ...... H05B 6/12; H05B 6/1209; H05B 6/1218; H05B 6/1236; H05B 6/1227; H05B 1/02; H05B 6/36–365; F24C 15/10; F24C 15/108; F24C 15/30
USPC ........ 219/620–622, 624–627, 660, 661, 664, 219/667, 671–672
See application file for complete search history.

(56) References Cited

U.S. PATENT DOCUMENTS

2018/0376541 A1* 12/2018 Hwangbo .............. H05B 6/062
2022/0071451 A1* 3/2022 Siu .......................... A47J 44/00

FOREIGN PATENT DOCUMENTS

| KR | 101757336 B1 | 7/2017 |
|---|---|---|
| KR | 1020180082858 A | 7/2018 |
| KR | 1020190063881 A | 6/2019 |
| KR | 102021332 B1 | 9/2019 |
| KR | 102045993 B1 | 11/2019 |
| KR | 1020190134951 A | 12/2019 |

OTHER PUBLICATIONS

WIPO, Written Opinion ISA 237 for International Application No. PCT/KR2020/004910, Oct. 30, 2020, 4 pages.

\* cited by examiner

FIG. 3

| DISTANCE (mm) | N-POLE A/D VALUE | S-POLE A/D VALUE |
|---|---|---|
| 1 | 81 | 1023 |
| 5 | 84 | 1006 |
| 15 | 120 | 787 |
| 20 | 208 | 688 |
| 25 | 347 | 623 |
| 30 | 389 | 581 |
| 35 | 415 | 554 |
| 40 | 434 | 536 |
| 45 | 446 | 524 |
| 50 | 455 | 515 |
| 55 | 461 | 508 |
| 60 | 467 | 503 |

UNDER-INDUCTION RANGE SYSTEM

CROSS-REFERENCE TO RELATED APPLICATION

This application is a US Bypass Continuation Application of International Application No. PCT/KR2020/004910, filed on Apr. 10, 2020, and designating the United States, the International Application claiming a priority date of Mar. 13, 2020, based on prior Korean Application No. 10-2020-0031239, filed on Mar. 13, 2020, the disclosure of which is incorporated herein by reference in its entirety.

BACKGROUND

Technical Field

The present invention relates to an induction range which raises a temperature of a container using a magnetic field, and more specifically, to an under-induction range system capable of controlling operation of an induction range according to a height to a container in an under-structure in which the induction range is disposed under a table such as a dining table.

Background Art

Electronic ranges, gas ranges, ovens, and the like are used as heating devices for cooking food. However, the use of induction ranges has increased due to indoor air pollution problems, indoor temperature rising problems, and the like. An induction range is a heating cookware using an induction heating method and has great advantages in terms of high energy efficiency and stability. In addition, an induction range has the advantages that there is no oxygen consumption and no waste gas emission. When magnetic field lines generated when an alternating-current (AC) current with a high frequency is applied penetrate a bottom of a dedicated container placed on a top plate of an induction range, the induction range heats only the dedicated container using an eddy current generated due to a resistance component.

Meanwhile, in an induction range, since a range in which a magnetic field is applied is small, a dedicated container is placed on a top plate of the induction range and used. In contrast, there are also cases in which an installation position thereof is changed to a lower portion of a dining table due to problems such as contamination from existing food, damage, and the like. However, in these cases, since a thickness of a top plate of a dining table or the like used in its place is changed according to an installation place, a problem that a distance between a coil and the dedicated container is out of a proper heating range occurs frequently. In addition, the distance between the coil and the dedicated container can be changed for different reasons. Meanwhile, since this causes excessive operation of the induction range, subsequent problems such as durability degradation such as damage to components of an internal circuit and degradation of thermal efficiency of the induction range have occurred.

SUMMARY

Technical Problem

The present invention is directed to providing an under-induction range system capable of controlling operation of an induction range according to a thickness of a top plate of a dining table or the like or a height between an induction coil and a dedicated container.

In addition, the present invention is directed to improving durability and thermal efficiency by automatically blocking power being supplied to a coil when an induction range operates outside a proper operating range. In addition, the present invention is directed to providing an under-induction range system capable of controlling power supplied to an induction range using a support member on which a dedicated container is seated.

Technical Solution

One aspect of the present invention provides an under-induction range system including a top plate unit, an induction unit fixedly disposed at a lower side of the top plate unit and configured to heat a heating target container positioned in a space above the top plate unit using a magnetic field generated by a circular coil, a Hall sensor unit disposed in a central portion of the circular coil disposed in an inner space of the induction unit, a control unit electrically connected to the Hall sensor unit, and a multi-support unit which controls operation of the induction unit according to a measurement value detected by the Hall sensor unit when a magnetic member buried therein is positioned at a matching area of a top surface of the top plate unit and on which the heating target container is seated.

When the measurement value is out of a preset range, the control unit may block power being supplied to the circular coil.

The Hall sensor unit may include a Hall sensor which is disposed in contact with an inner surface of a top plate of a housing of the induction unit and detects a magnetic field of the magnetic member and an A/D conversion unit configured to convert a voltage measured by the Hall sensor to a digital value.

The measurement value may denote a thickness of the top plate unit, and the control unit may adjust a maximum output power of the circular coil according to the thickness.

The matching area may have a circular shape, and an operating area which is concentric with the matching area and has a radius greater than a radius of the matching area may be formed on the top surface of the top plate unit.

When the magnetic member moves out of the operating area, the control unit may block power being supplied to the circular coil.

Circular marks indicating a buried position of the magnetic member may be formed on top and bottom surfaces of the multi-support unit.

The circular coil may be disposed in contact with an inner surface of a top plate of a housing of the induction unit.

BRIEF DESCRIPTION OF THE DRAWINGS

FIG. 3 is a table showing a relationship between an A/D value converted through a Hall sensor unit of FIG. 1 and a distance.

DETAILED DESCRIPTION

Hereinafter, when the present invention is described, in a case in which it is determined that the detailed descriptions of related technologies well-known to those skilled in the art unnecessarily obscure the gist of the invention, the detailed descriptions will be omitted. The terminologies used herein are for the purpose of describing particular embodiments only and are not intended to be limiting to the invention. The singular forms are intended to include the plural forms as well, unless the context clearly indicates otherwise.

It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

Hereinafter, specific embodiments of the present invention will be described in detail with reference to the accompanying drawings.

Figure 1:
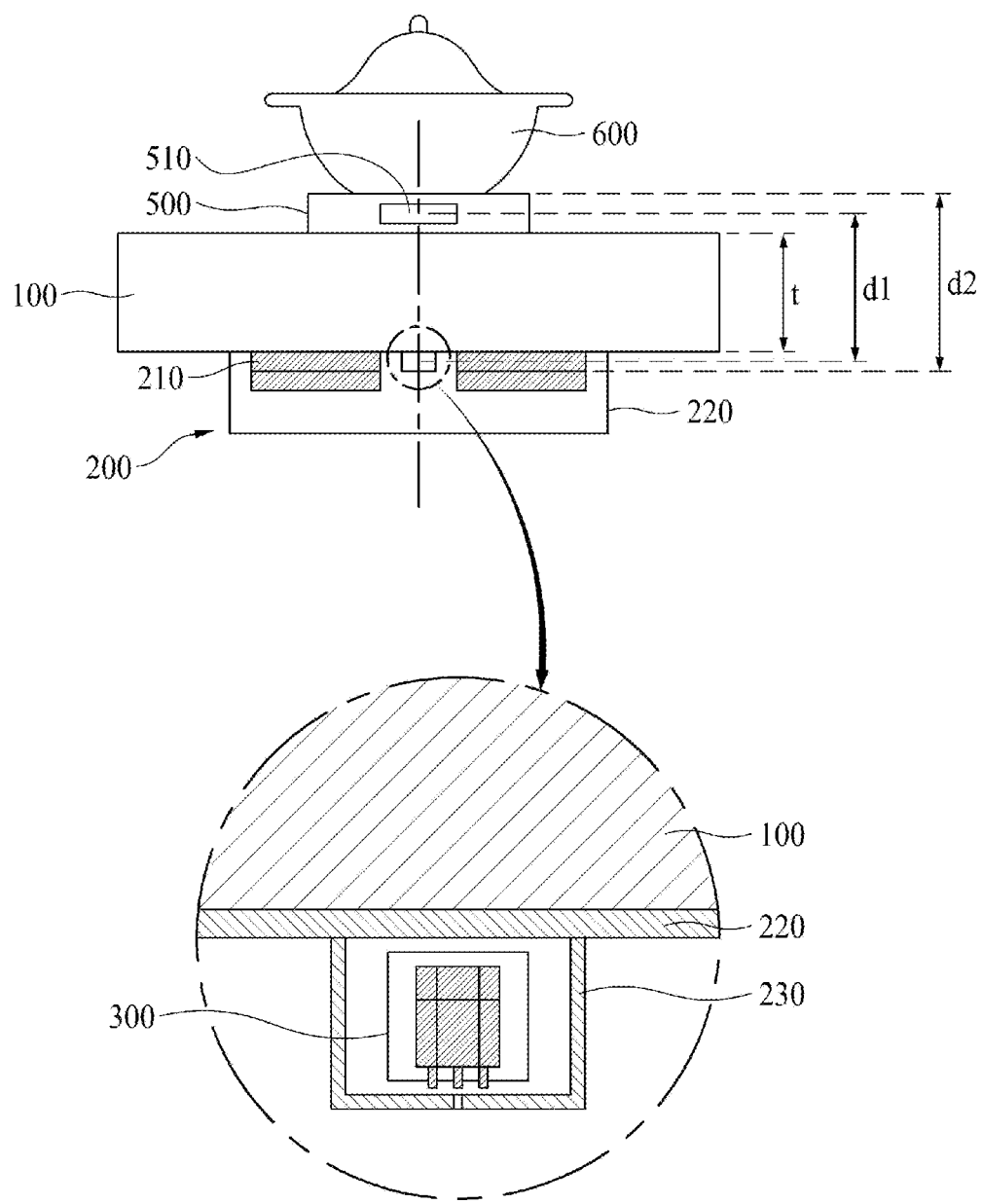
FIG. 1 is a schematic configuration diagram illustrating an under-induction range system according to one embodiment of the present invention.
Figure 2:
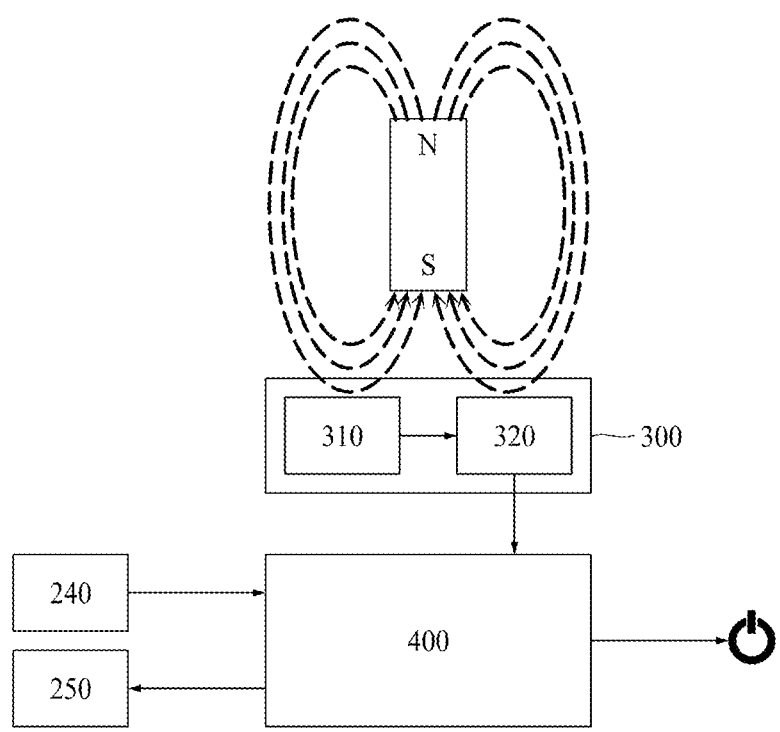
FIG. 2 is a block diagram illustrating a configuration of an induction unit of FIG. 1.
Figure 4:
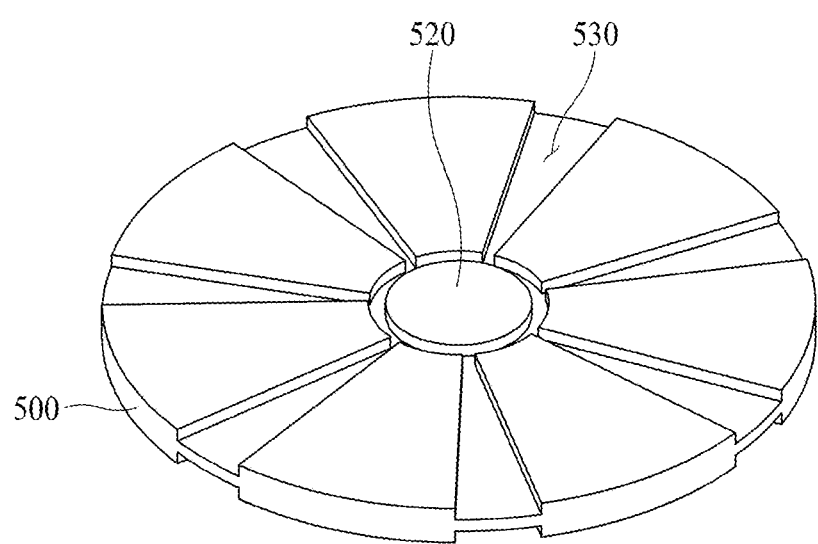
FIG. 4 is a schematic view illustrating a multi-support unit of FIG. 1.
Figure 5:
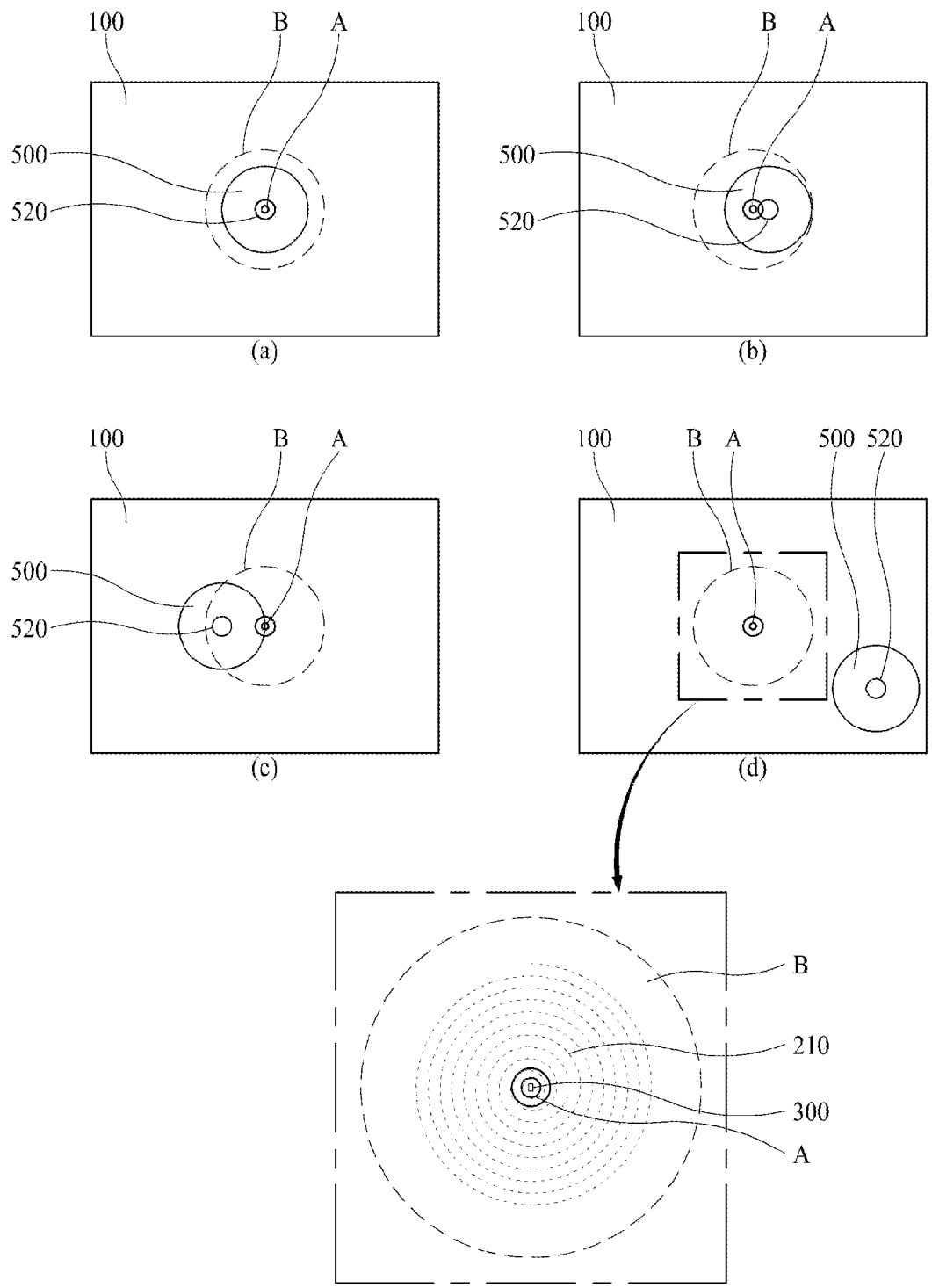
FIG. 5 is a set of views illustrating various layouts of the multi-support unit according to a matching area and an operation area.

FIG. 1 is a schematic configuration diagram illustrating an under-induction range system according to one embodiment of the present invention, FIG. 2 is a block diagram illustrating a configuration of an induction unit of FIG. 1, FIG. 3 is a table showing a relationship between an A/D value converted through a Hall sensor unit of FIG. 1 and a distance, FIG. 4 is a schematic view illustrating a multi-support unit of FIG. 1, and FIG. 5 is a set of views illustrating various layouts of the multi-support unit according a matching area and an operation area.

Referring to FIGS. 1 to 5, an under-induction range system according to one embodiment of the present invention may include a top plate unit 100, an induction unit 200, a Hall sensor unit 300, a control unit 400, a multi-support unit 500, and the like. In addition, the present system may further include a dedicated heating target container 600 with high energy efficiency in a set.

The top plate unit 100 is a unit on which the induction unit 200 is installed and is a top plate of a dining table or the like used at a home or in a restaurant. In addition, the top plate unit 100 is not necessarily limited to the top plate of a dining table or the like as long as cooking is possible. For example, the top plate unit 100 may be a top plate of a sink or the like. The top plate unit 100 may be formed of any one material selected from the group of non-magnetic materials such as marble, wood, glass, and the like. In addition, top and bottom surfaces of the top plate unit 100 are formed to be flat, and the top plate unit 100 has a thickness t within a predetermined range. The range of the thickness t of the top plate unit 100 may be changed according to the material of the top plate unit 100.

When the thickness t of the top plate unit 100 is out of the predetermined range, the under-induction range system according to one embodiment is designed such that the induction unit 200 does not operate. In addition, when the present system according to one embodiment detects a height (distance) between a circular coil 210 and the heating target container 600, and the height (distance) is within a predetermined range, the present system is designed so that the induction unit 200 operates.

A matching area A which guides a position of a fire port to a user may be formed on the top surface of the top plate unit 100. Accordingly, the multi-support unit 500 may be accurately disposed at a specific position on the top plate unit 100. For example, the matching area A may be formed on the top surface of the top plate unit 100 using a sticker. In addition, the matching area A may be semi-permanently formed on the top surface of the top plate unit 100 in an intaglio manner. The matching area A may be formed in a circular shape. In addition, the matching area A may have a shape in which a plurality of concentric circles with different radii are repeated.

On the top surface of the top plate unit 100, an operating area B concentric with the matching area A and having a radius greater than the radius of the matching area A may be formed. In this case, the operating area B is an area of which uses and functions are distinguished from those of the matching area A and may be marked visually or non-visually.

The induction unit 200 heats food in the heating target container 600 in an indirect manner of inducing the heating target container 600 to heat using a magnetic field. The induction unit 200 according to one embodiment is fixedly disposed under the top plate unit 100 and heats the heating target container 600 positioned in a space above the top plate unit 100 using a magnetic field generated by the circular coil 210. The induction unit 200 may be directly attached to and fixedly installed on the bottom surface of the top plate unit 100 or fixedly installed a predetermined distance from the bottom surface of the top plate unit 100.

Specifically, the induction unit 200 includes a housing 220 which accommodates the circular coil 210, a printed circuit board (not shown), the Hall sensor unit 300, and the like. In the under-induction range system according to one embodiment, the reason why the induction unit 200 is disposed under the top plate unit 100 is that a separation distance d2 between the circular coil 210 and a bottom surface of the heating target container 600 is relatively great when compared to a conventional induction range. Meanwhile, the circular coil 210 is installed in a limited inner space of the induction unit 200.

As a result, it is necessary to increase the number of turns of the circular coil 210 per unit area according to one embodiment to maximize heating efficiency for the heating target container 600. To this end, the circular coil 210 may be wound around a circular plate unit (not shown) a plurality of times and formed to have at least one step. Meanwhile, an empty space is formed in a central portion of the circular coil. In addition, the circular coil 210 according to one embodiment may be disposed in contact with an inner surface of a top plate of the housing 220 of the induction unit 200. Accordingly, the separation distance d2 between the circular coil 210 and the heating target container 600 is minimized.

A magnetic field is generated around a magnetic member 510 of the multi-support unit 500. The Hall sensor unit 300 serves as a sensor that detects a small voltage generated when reacting to the magnetic field and amplifies the small voltage through a transistor. The Hall sensor unit 300 may detect a measurement value to measure the thickness t of the top plate unit 100 using the multi-support unit 500. Accordingly, the Hall sensor unit 300 is disposed in the inner space of the induction unit 200. Particularly, the Hall sensor unit 300 may be disposed in a central portion of the circular coil 210 disposed in the inner space of the induction unit 200. In this case, the Hall sensor unit 300 may be disposed in contact with the inner surface of the top plate of the housing 220 of the induction unit 200. That is, the circular coil 210 and the Hall sensor unit 300 are positioned at the same level in the induction unit 200.

In addition, the Hall sensor unit 300 may be positioned vertically upward or downward from a center of the circular coil 210. That is, the Hall sensor unit 300 is disposed on a virtual line passing through the center of the circular coil 210. As described above, the present system can be semi-permanently used due to the use of the noncontact type Hall sensor unit 300.

The Hall sensor unit 300 according to one embodiment includes a Hall sensor 310, an A/D conversion unit 320, and the like. The Hall sensor 310 detects a magnetic field of the magnetic member 510. The Hall sensor 310 may be a bipolar type Hall sensor and detect a magnetic field according to each of an N-pole and an S-pole. The Hall sensor 310 according to one embodiment outputs half of an applied voltage Vdd when there is no magnetic field. In addition, the Hall sensor 310 detects different voltages according to a magnetic field according to each of the S-pole and the N-pole. The Hall sensor 310 may be connected to the printed circuit board, which will be described below, through an electrical wire.

The A/D conversion unit 320 converts a voltage measured by the Hall sensor 310 to a digital value. Meanwhile, the digital value may be converted to a distance d1 between the Hall sensor unit 300 and the magnetic member 510 through calculation by a microcomputer. In this case, the microcomputer compares the digital value and data stored in a memory unit (not shown) to calculate the distance d1. Through this, the under-induction range system according to one embodiment may calculate the thickness t of the top plate unit 100.

FIG. 3 shows A/D values converted through the Hall sensor unit 300 according to one embodiment and the distance d1 between the Hall sensor unit 300 and the magnetic member 510. In this case, each of the A/D values is an integer converted to be recognized by the microcomputer. In addition, it can be seen that the A/D value changes according to a direction of a magnetic pole of the magnetic member 510. Meanwhile, when the performance of the induction unit 200 according to one embodiment is considered, the distance d1 between the Hall sensor unit 300 according to one embodiment and the magnetic member 510 may be in the range of 1 to 60 mm.

Meanwhile, the Hall sensor unit 300 may be disposed in a circular accommodation unit 230 having an empty space therein. A bottom surface and a side surface of the circular accommodation unit 230 may be formed as a metal shield member. The circular accommodation unit 230 may be formed in the central portion of the circular coil 210 and coupled to the circular plate unit (not shown) in a press-fit manner. The circular accommodation unit 230 may be formed on the virtual line passing through the center of the circular coil 210. Meanwhile, an upper end of the side surface of the circular accommodation unit 230 may be in contact with the inner surface of the top plate of the housing 220 of the induction unit 200.

The induction unit 200 further includes the control unit 400 electrically connected to the Hall sensor unit 300. The control unit 400 may be formed using electrical wires formed on the printed circuit board and circuit elements, such as semiconductors, capacitors, and resistors, mounted on a top surface of the printed circuit board. In addition, the induction unit 200 may include an input unit 240 formed as, for example, a button or touch type panel. In addition, the induction unit 200 may further include a display unit 250 configured to visually and audibly notify of an operation state and the like.

The multi-support unit 500 provides a support surface on which the heating target container 600 is seated. To this end, the multi-support unit 500 may be formed of a material with high heat resistance but a low heat transfer rate. The multi-support unit 500 may be formed of a material selected from the group consisting of, for example, silicone, rubber, marble, wood, and glass. In addition, heat radiation grooves 530 with specific patterns which guide heat generated by the heating target container 600 to be easily radiated in the air may be formed on top and bottom surfaces of the multi-support unit 500.

Meanwhile, the multi-support unit 500 may control operation of the induction unit 200 using the magnetic member 510 buried therein. The user may manipulate a power button to turn on/off a power source of the induction unit 200. However, in the under-induction range system according to one embodiment, the multi-support unit 500 should be disposed under the heating target container 600 in order to heat the heating target container 600.

That is, in a state in which the power source of the induction unit 200 is turned on, even when the heating target container 600 is placed on the top surface of the top plate unit 100, the induction unit 200 does not operate. In addition, in the state in which the power source of the induction unit 200 is turned on, even when the heating target container 600 is placed in the matching area A or the operating area B on the top surface of the top plate unit 100, the induction unit 200 does not operate. As described above, the multi-support unit 500 according to one embodiment may control operation of the induction unit 200 according to a measurement value detected by the Hall sensor unit 300 when the magnetic member 510 buried therein is positioned in the matching area A on the top surface of the top plate unit 100.

Meanwhile, circular marks 520 indicating a position where the magnetic member 510 is buried may be formed on the top and bottom surfaces of the multi-support unit 500. The circular marks 520 may be directly marked on central portions of the top and bottom surfaces to be distinguished from the heat radiation grooves 530. Alternatively, the circular marks 520 may be formed as concave grooves concavely formed in the central portions of the top and bottom surfaces of the multi-support unit 500. Accordingly, the circular marks 520 may be formed in a shape that matches the matching area A.

The magnetic member 510 may be a magnet having two ends at which an N-pole and an S-pole are formed. In addition, magnetic field lines formed around the multi-support unit 500 by the magnetic member 510 may have a shape connecting the top and bottom surfaces of the multi-support unit 500. In this case, the magnetic member 510 may be disposed so that, for example, when the N-pole faces the top surface of the multi-support unit 500, the S-pole faces the bottom surface. In this case, a distance between the top surface and an end of the N-pole may be equal to a distance between the bottom surface and an end of the S-pole of the magnetic member 510. Alternatively, the distance between the top surface and the end of the N-pole may be different from the distance between the bottom surface and the end of the S-pole of the magnetic member 510. That is, the magnetic member 510 may be disposed closer to any one surface of the multi-support unit 500.

When the user places the multi-support unit 500 on the top plate unit 100 so that the circular mark 520 accurately matches the matching area A, the under-induction range system may calculate any one of the thickness t of the top plate unit 100, the distance d1 between the Hall sensor unit 300 and the magnetic member 510, and a distance between the Hall sensor unit 300 and the heating target container 600 using a measurement value detected by the Hall sensor unit 300. In this case, when the measurement value is out of a preset range, the control unit 400 may block power being supplied to the circular coil 210. When the separation distance d2 between the circular coil 210 and the bottom surface of the heating target container 600 exceeds a proper distance due to the thickness t of the top plate unit 100, the present system may have problems of performance degradation and durability due to a failure and the like. In addition, when the measurement value is out of the preset range, an error code may be displayed on the display unit 250.

Meanwhile, when a measurement value detected by the Hall sensor unit 300 is detected a plurality of times, the control unit 400 may be programmed such that the Hall sensor unit 300 does not detect the measurement value. The measurement value according to one embodiment may be the thickness t of the top plate unit 100. In this case, the control unit 400 may adjust a maximum output power of the circular coil 210 according to the thickness t of the top plate unit 100. As a result, the present system can prevent overheating and burnout of circuit components installed in the induction unit 200.

In addition, when the magnetic member 510 moves out of the operating area B, the control unit 400 may block power being supplied to the circular coil 210. However, when the magnetic member 510 is positioned within the operating area B, the control unit 400 may maintain power being supplied to the circular coil 210. Referring to FIG. 5, when the multi-support unit 500 is disposed on the top plate unit 100, it may be checked whether the magnetic member 510 is positioned inside or outside the operating area B using the circular mark 520. That is, in a case a) in which the circular mark 520 accurately matches the matching area A, in a case b) in which the circular mark 520 is positioned between the matching area A and the operating area B, and in a case c) in which the circular mark 520 is positioned outside the matching area A and inside the operating area B, the control unit 400 maintains power being supplied to the circular coil 210. In this case, thermal efficiency of the present system is maximized in the case a). However, in a case d) in which the circular mark 520 is outside the operating area B, the control unit 400 blocks power being supplied to the circular coil 210.

In the cases a) to c), when the heating target container 600 is placed on the top surface of the multi-support unit 500, the induction unit 200 may then start heating. Accordingly, when the power button disposed on the induction unit 200 is referred to as a first power switch, the multi-support unit 500 is like a second power switch configured to doubly control power being supplied to the circular coil 210 for safety in use in addition thereto. That is, power being supplied to the circular coil 210 is supplied and maintained in a state in which both the first and second power switches are turned on. In this case, a magnetic field generated by the circular coil 210 penetrates the top plate unit 100 and the multi-support unit 500 and acts on the heating target container 600.

According to problem-solving means of the present invention described above, various effects including the following effects can be expected. However, not all of the following effects are necessary to constitute the present invention.

According to embodiments, an under-induction range system can control operation of an induction range according to a thickness of a top plate of a dining table or the like and a height between an induction coil and a dedicated container. More specifically, when the induction range operates outside a proper operation range, the under-induction range system can automatically block power being supplied to the coil to improve its durability.

In addition, the under-induction range system can be semi-permanently used by using a noncontact type Hall sensor. In addition, the under-induction range system can form a matching area to maximize thermal efficiency. In addition, the under-induction range system can control the power supplied to the coil by using a multi-support unit including a magnetic member.

Although an example of the exemplary embodiment of the present invention has been described, the scope of the present invention is not limited to the specific embodiment and may be properly changed within the range described in the claims.

What is claimed is:

1. An under-induction range system comprising:
   a top plate unit having a top surface on which a matching area and an operating area are respectively indicated, the matching area having a circular shape and the operating area being concentric with the matching area, the operating area having a greater radius than a radius of the matching area;
   an induction unit fixedly disposed at a lower side of the top plate unit and configured to heat a heating target container positioned in a space above the top plate unit using a magnetic field generated by a circular coil;
   a Hall sensor unit disposed in a central portion of the circular coil disposed in an inner space of the induction unit;
   a control unit electrically connected to the Hall sensor unit; and
   a multi-support unit which controls operation of the induction unit according to a measurement value detected by the Hall sensor unit when a magnetic member buried therein is positioned at the matching area or the operating area and on which the heating target container is seated,
   wherein the multi-support unit is movable and placeable at different positions on the top surface of the top plate unit,
   wherein the multi-support unit is configured to form circular marks on top and bottom surfaces of the multi-support unit to indicate a buried position of the magnetic member,
   wherein, when the multi-support unit is disposed on the top plate unit such that the circular marks accurately match the matching area, any one of a i) thickness of the top plate unit, ii) a distance between the Hall sensor unit and the magnetic member, and iii) a distance between the Hall sensor unit and the heating target container is calculated using the measurement value detected by the Hall sensor unit, and when the measurement value is out of a preset range, the control unit blocks power being supplied to the circular coil.

2. The under-induction range system of claim 1, wherein the Hall sensor unit includes:
   a Hall sensor which is disposed in contact with an inner surface of a top plate of a housing of the induction unit and detects a magnetic field of the magnetic member; and
   an A/D conversion unit configured to convert a voltage measured by the Hall sensor to a digital value.

3. The under-induction range system of claim 1, wherein, when the magnetic member moves out of the operating area, the control unit blocks power being supplied to the circular coil.

4. The under-induction range system of claim 1, wherein the circular coil is disposed in contact with an inner surface of a top plate of a housing of the induction unit.

5. The under-induction range system of claim 1, wherein the matching area is formed on the top surface of the top plate unit using a sticker.

6. The under-induction range system of claim 1, wherein multi-support unit is formed of a material selected from the group consisting of silicone, rubber, marble, wood, and glass.

7. The under-induction range system of claim 1, wherein heat radiation grooves with specific patterns which guide heat generated by the heating target container is formed on the top and bottom surfaces of the multi-support unit.

8. The under-induction range system of claim 7, wherein the circular marks are directly marked on central portions of the top and bottom surfaces of the multi-support unit to be distinguished from the heat radiation grooves.

9. The under-induction range system of claim 1, wherein the control unit maintains power being supplied to the circular coil in a case:

a) in which the circular marks accurately match the matching area;

b) in which the circular marks are positioned between the matching area and the operating area; and c) in which the circular marks are positioned outside the matching area and inside the operating area.

10. The under-induction range system of claim 1, wherein the control unit blocks power being supplied to the circular coil in a case in which the circular marks are outside the operating area.

11. The under-induction range system of claim 10, further comprising a first power switch, wherein multi-support unit including the circular marks functions as a second power switch configured to doubly control power being supplied to the circular coil.

12. The under-induction range system of claim 11, wherein power being supplied to the circular coil is supplied and maintained in a state in which both the first and second power switches are turned on.

13. The under-induction range system of claim 1, wherein the Hall sensor unit is a noncontact type Hall sensor.

* * * * *